(12) United States Patent
Kamei

(10) Patent No.: US 7,870,396 B2
(45) Date of Patent: Jan. 11, 2011

(54) STORAGE MEDIUM, METHOD, AND APPARATUS FOR CREATING A PROTECTED EXECUTABLE PROGRAM

(75) Inventor: Mitsuhisa Kamei, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1211 days.

(21) Appl. No.: 11/452,540

(22) Filed: Jun. 14, 2006

(65) Prior Publication Data
US 2007/0118763 A1   May 24, 2007

(30) Foreign Application Priority Data
Nov. 24, 2005   (JP) .............................. 2005-339269

(51) Int. Cl.
*G06F 11/30*   (2006.01)
*G06F 12/14*   (2006.01)
(52) U.S. Cl. ............... 713/190; 713/153; 713/164; 713/165; 713/166; 713/167; 719/331; 717/168; 717/169; 717/170; 717/171; 717/172; 717/173; 717/174; 717/175; 717/176; 717/177; 717/178
(58) Field of Classification Search .............. 713/190
See application file for complete search history.

(56) References Cited
U.S. PATENT DOCUMENTS

| | | | | |
|---|---|---|---|---|
| 5,915,017 A | * | 6/1999 | Sung et al. | ............... 713/187 |
| 5,983,021 A | * | 11/1999 | Mitrovic | ............... 717/158 |
| 6,715,142 B1 | * | 3/2004 | Saito et al. | ............... 717/159 |
| 7,367,021 B2 | * | 4/2008 | Ansari et al. | ............... 717/151 |
| 7,490,268 B2 | * | 2/2009 | Keromytis et al. | ............ 714/38 |

FOREIGN PATENT DOCUMENTS

| JP | 2000076075 | 3/2000 |
|---|---|---|
| JP | 2005165919 | 6/2005 |

* cited by examiner

*Primary Examiner*—Taghi T Arani
*Assistant Examiner*—Narciso Victoria
(74) *Attorney, Agent, or Firm*—Gauthier & Connors LLP

(57) ABSTRACT

A storage medium readable by a computer is provided. The storage medium stores a program of instructions executable by the computer to perform a function for protecting a target function. The function includes generating an inserted function, having a function name identical to the function name of the target function, that includes code for a process relating to protection of the target function and a call instruction for calling the target function after this process, and generating a protected executable code on the basis of an object code, in which the function name of a function definition of the target function has been changed to a second function name, and the inserted function.

19 Claims, 16 Drawing Sheets

US 7,870,396 B2

STORAGE MEDIUM, METHOD, AND APPARATUS FOR CREATING A PROTECTED EXECUTABLE PROGRAM

PRIORITY INFORMATION

This application claims priority to Japanese Patent Application No. 2005-339269, filed on Nov. 24, 2005, which is incorporated herein by reference in its entirety.

BACKGROUND

1. Technical Field

The present invention relates to a technique for adding partial protection (such as encryption) to a program so that the contents of a protected portion that is included in the program cannot be read.

2. Related Art

In a related art in this field, as shown in FIG. 1, marks (or codes for decryption) 112, 116 are inserted manually before and after a section 114 to be protected within a source code 100, a source code 110 after the insertion process is passed to a compiler and compiled, and an object code 120 that results is passed to a linker and a linking process is performed. An encryption tool is then applied to an object code 130 that results after the linking process. The encryption tool encrypts a section 134 to be protected in accordance with marks 132, 136 within the object code 130 (so that the encryption yields an encrypted code 144) and replaces the marks 132, 136 with a binary code (a decryption code 142) for decryption processing to finally generate an executable code 140.

Furthermore, another related technique inserts, instead of the marks in the above-mentioned related technique disclosed, a decryption code in the form of a function for decrypting the encrypted code. Briefly, in this technique, as shown in FIG. 2, a decryption function 212 is inserted manually before a section 214 to be protected within a source code 200 and a function 216 to indicate the end of an encrypted section is inserted manually after the section 214, a source code 210 after the insertion process is passed to a compiler and compiled, and an object code 220 that results is passed to a linker and linked to necessary code, such as an object code 230 for a decryption function. As a result, this generates an object code 240 including plain text of a section 244 to be protected following an instruction 242 that calls a decryption code 246. An encryption tool is then applied to an object code 240 that results after the linking process. The encryption tool encrypts the section 244 to be protected within the object code 240 (so that the encryption yields an encrypted code 254) to finally generate an executable code 250. If the executable code is executed, an instruction 252 causes a decryption code 256 to be called and executed so that the encrypted code 254 is decrypted and executed.

The above-mentioned related arts both achieve a function to partially protect a program in executable form. However, compilers generally perform code optimization in the code execution sequence. Since the execution sequence in code sections changes due to code optimization, another code section might stray into a code section to be encrypted or part of a code section to be encrypted might be moved outside to another location. Thus, since a section not intended for encryption might end up being encrypted together with the section that was intended for encryption or a section that was intended for encryption might end up outside the scope of the encryption and not being encrypted, there is a risk of creating a program that does not operate properly, for example, a program that runs away out of control. Although the careful creation of source code so as to prevent any change in the execution sequence in the section to be encrypted due to optimization is not necessarily impossible, it does force a large burden on the programmer.

SUMMARY

In one aspect of the invention, there is provided a storage medium readable by a computer, the storage medium storing a program of instructions executable by the computer to perform an function for protecting a target function, the function including generating an inserted function, having a function name identical to the function name of the target function, that includes code for a process relating to protection of the target function and a call instruction for calling the target function after the process, and generating a protected executable code on the basis of an object code, in which the function name of a function definition of the target function has been changed to a second function name, and the inserted function.

BRIEF DESCRIPTION OF THE DRAWINGS

Embodiments of the present invention will be described in detail based on the following figures, wherein.

DETAILED DESCRIPTION

Exemplary embodiments of the invention will be described hereinafter with reference to the attached drawings.

Figure 1:
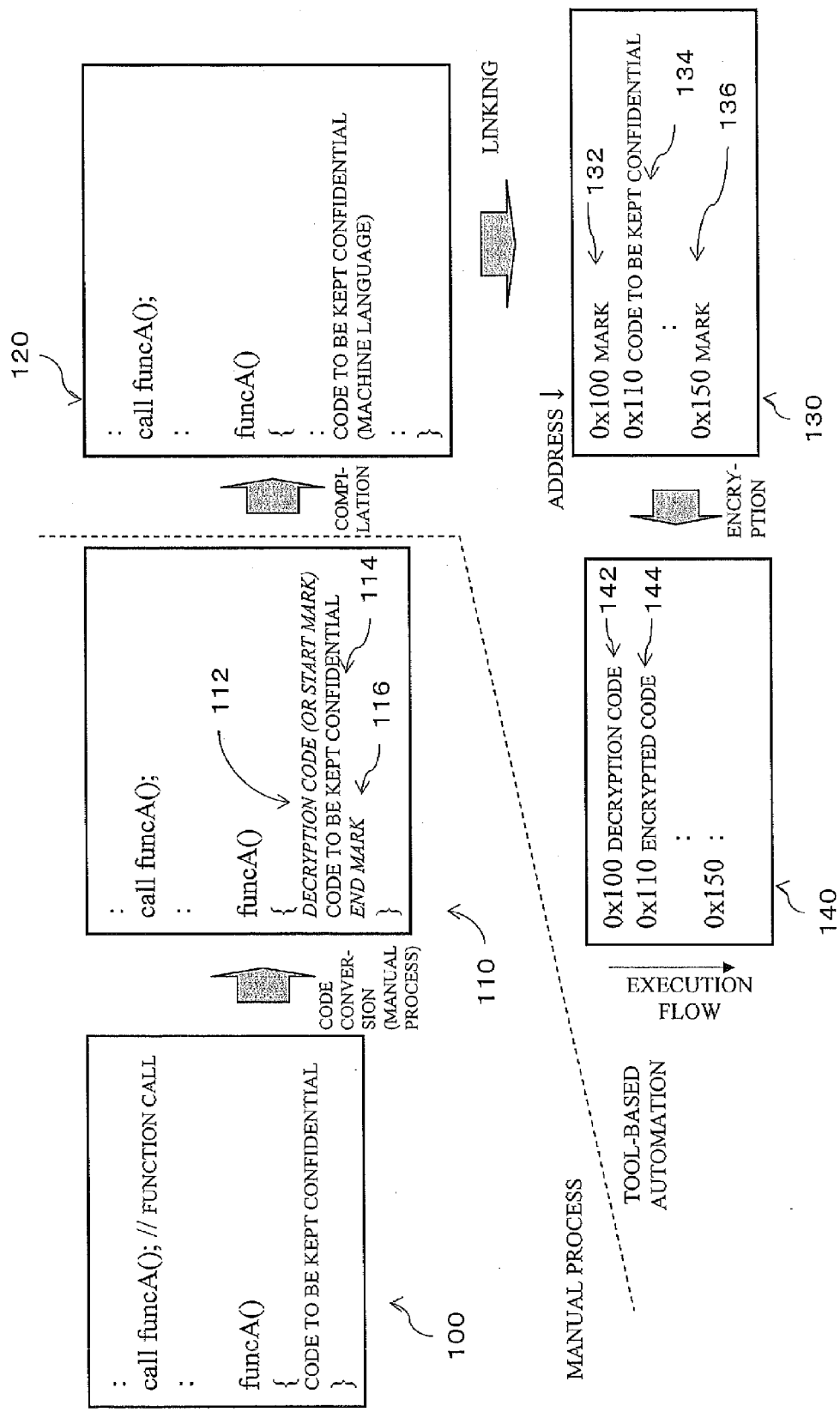
FIG. 1 illustrates the processing of an encrypted program creation system of the related art.
Figure 2:
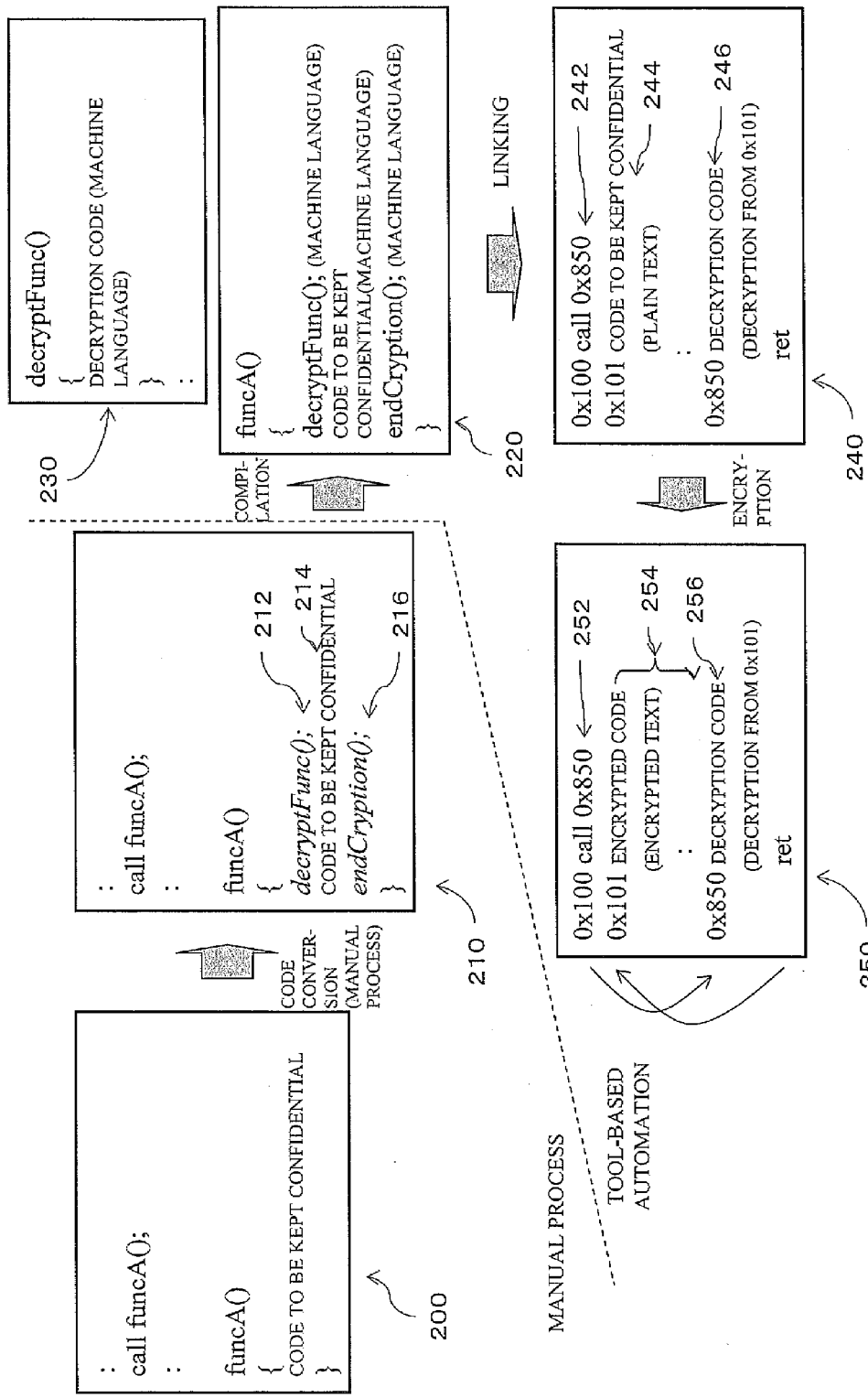
FIG. 2 illustrates the processing of an encrypted program creation system of another related art.
Figure 3:
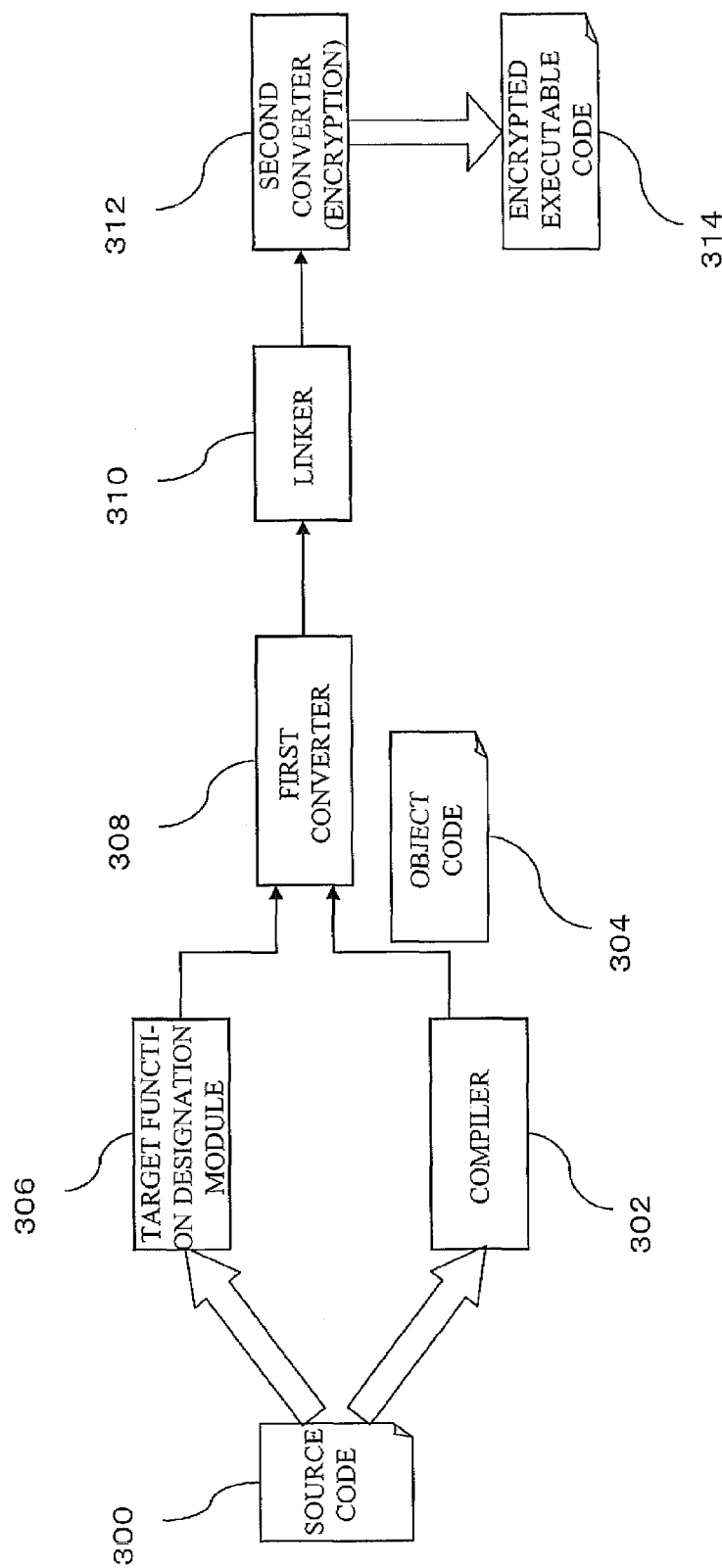
FIG. 3 shows one exemplary embodiment of an encrypted program creation system for creating an encrypted program in which a code section to be protected is encrypted.

FIG. 3 shows an exemplary embodiment of an encrypted executable program creation system for creating an encrypted program in which a section of code to be protected is encrypted. This system comprises a compiler 302, a target function designation module 306, a first converter 308, a linker 310, and a second converter 312. These modules 302, 306, 308, 310, 312 are typically implemented by executing a program, in which are programmed the functions or processes for each module to be described hereinafter, on a general-purpose computer comprising a CPU, memory, fixed storage device, display device, and input devices, such as a keyboard and mouse. Such a program can be installed on the computer by loading it from a portable recorded medium, such as a CD-ROM or DVD, or downloading it via a network. It should be noted that it is not necessary for all the modules to be mounted in a single computer and a system can be configured with the modules are distributed and mounted in multiple computers so that the modules are linked in operation.

The compiler 302 compiles a source code 300 of a program to be processed and generates an object code 304. A conventional compiler may be used for the compiler 302. Although marks or call instructions for a decryption function were manually inserted into source code in the above-mentioned related arts, the source code 300 is not manually edited in the example of FIG. 3. The compiler 302 may compile the source code 300 using a well known technique.

The target function designation module 306 receives from a user a designation of a function for an object to be protected (encrypted in this example) within the source code 300. The target function designation module 306, for example, allows a function to be selected for an object to be protected (hereinafter referred to as a target function) by displaying the source code 300 on a screen, arranging check boxes near the functions included in the source code 300, and providing a selection state, where a user can click a check box. Instead of displaying the source code 300, the functions included within the source code 300 may be extracted and displayed on screen with corresponding check boxes and then selected by a user. The target function designation module 306 then generates and outputs a list (such as list of function names) of target functions selected by the user via such a user interface screen.

The list of function names of the target functions may instead be created by the user using a text editor and then received by the target function designation module 306.

The first converter 308 performs conversion on the object code 304 generated by the compiler 302 using the target function list generated by the target function designation module 306. This conversion will be referred to as "conversion 1". In conversion 1, the target function names (or symbol names signifying functions) within the object code 304 are changed to different names. Furthermore, in conversion 1, an inserted function is created to enable the target functions to be appropriately encrypted and to enable the encrypted functions to be appropriately decrypted at execution. The changing of function names and the creation of the inserted function will be detailed later.

The first converter 308 outputs, for example, the object code in which the function names have been changed and the inserted function as separate files. Furthermore, the first converter 308 may instead add the inserted function into the file of the object code in which the function names have been changed and then output the file. Files of the inserted function and the object code that was output by the first converter 308, or a file combining both are passed to the linker 310.

The linker 310 links the file (or files) received from the first converter 308 and other necessary functions, such as a library, into one executable program file. A general linker from the prior art may be used for the linker 310.

The second converter 312 acquires the executable program file that was output from the linker 310 and encrypts the section therein to be protected and generates a file of an encrypted executable code 314 that is partially encrypted. The process (including encryption) performed by the second converter 312 will be referred to as "conversion 2". The details of conversion 2 will be given later.

Figure 4:
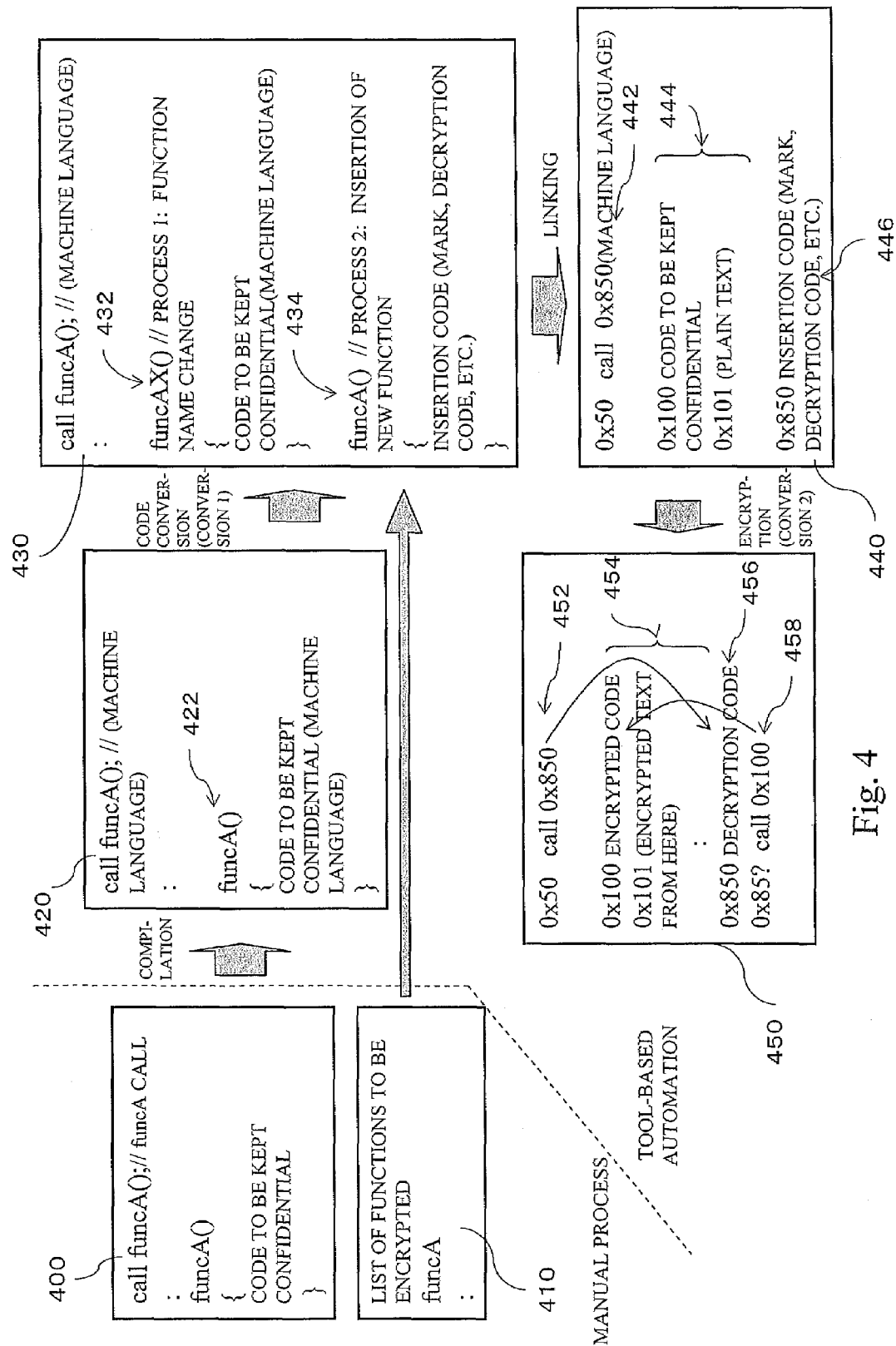
FIG. 4 schematically shows the flow of processing executed by the system of FIG. 3.

FIG. 4 schematically shows the flow of processing executed by the system of FIG. 3. In this embodiment, the manual steps performed by a user includes creating a source code 400 (corresponding to the source code 300 of FIG. 3) that includes the code section to be protected and creating a list 410 of functions to be encrypted by operating the target function designation module 306. The remainder of the procedure is automated and basically does not require any user action.

The source code 400 is converted to an object code 420 (corresponding to the object code 304 of FIG. 3) by the compiler 302. In this example, a function denoted as a function name funcA 422 in the object code 420 is the target function.

The object code 420 undergoes the process of "conversion 1" by the first converter 308. In "conversion 1", the function name of the target function is changed to another function name. The function name is changed to a name so as not to coincide with a function name of an existing function within the object code 420 and not to coincide with a function name of another target function after a name change. For example, one method is to create the function name for rafter the change by adding a specific character string (or data string) to the original function name. The addition of a character string that is not used in ordinary function names or the addition of a sufficiently long character string can yield a function name that does not coincide with other function names. In the example shown, the original function name "funcA" has been changed to a function name "funcAX" 432 with the addition of character string "X.". It should be noted that although the function name in the definition (body of the function) of the target function is changed in "conversion 1" in this manner, the function name within the instruction calling the target function is not changed.

Furthermore, an inserted function 434 is created in "conversion 1". The first converter 308 furnishes the function name "funcA", which is the same name as the original target function, to the inserted function 434. As a result, the instruction for calling the target function "funcA" within an object code 430 calls the inserted function 434 and not the target function.

Figure 5:
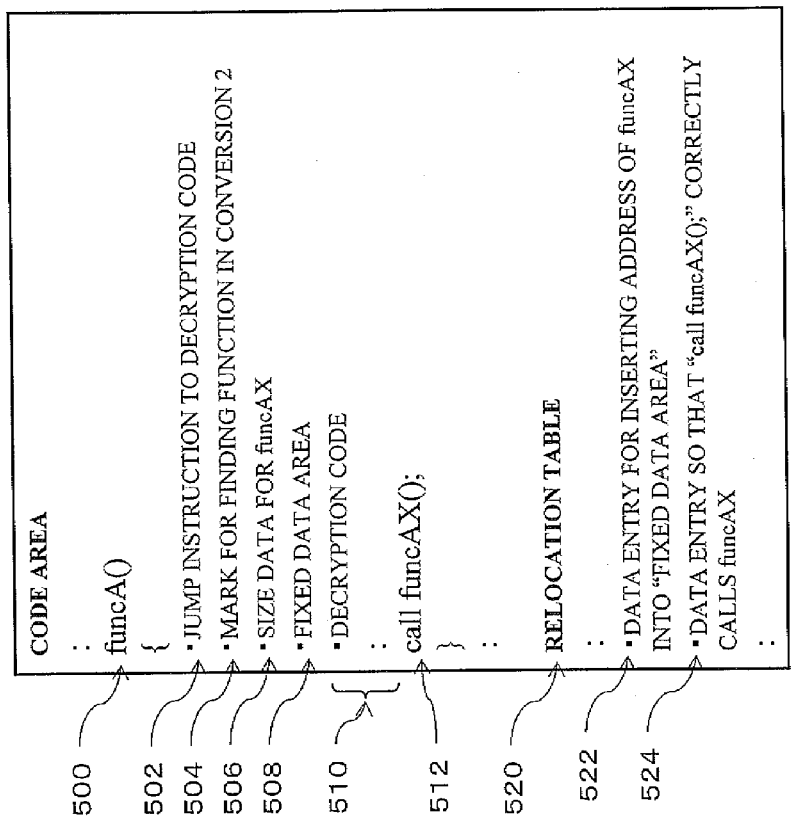
FIG. 5 schematically shows one example of the contents of the inserted function.

FIG. 5 schematically shows one example of the inserted function 434 (shown in FIG. 5 as an inserted function 500) that is created by "conversion 1".

A jump instruction 502 to a decryption code 510 is first positioned at the beginning of the inserted function 500. Thereafter, data 504, data 506, and data area 508 to be used in the processing for "conversion 2" (encryption) to be described later are positioned further followed by the decryption code 510. The decryption code 510 includes at least one instruction for a decryption process. Because the decryption function is unchanging, it may be retained in the second converter 312. Data may be set into a relocation table (to be detailed later) so that information indicating, for example, the addresses of encrypted functions to be decrypted by the decryption process are embedded by the linker 310 after the addresses have been determined. The address of the jump destination of the jump instruction 502 can be determined since the size of the data 504 to data 508 in between is known. The data 504 represents special mark information for finding the function 500 in the process of "conversion 2" and uses a data string that is generally not expressed within executable code. The data 506 indicates the size of the function "funcAX" (namely, the target function that has had the function name changed). This can be obtained from the object code 420.

Furthermore, the fixed data area 508 is a data area having a sufficient size to store address information. An address for the function "funcAX" assigned by a subsequent process of the linker 310 is set into this fixed data area. Namely, since the inserted function "funcA" is for decrypting the target function "funcAX", the address of the function "funcAX" is necessary for the decryption process and function invocation. However, the value of the address where the function is to be loaded during execution cannot be determined until after the linker 310 has performed linking. Thus, the fixed data area 508 is reserved here in advance as space for holding the address of the function "funcAX" obtained by the linker 310.

The decryption code 510, in which is described a process for decrypting the encrypted target function, is positioned after the above-mentioned data 504 to data 508. The position of the code to be decrypted by the decryption code 510 is acquired by referencing the data 506 on the size of the function "funcAX" and the start address of the function "funcAX" to be written by the linker 310 to a position after the fixed data area 508. Although the data 504 is used in the encryption process (conversion 2), it is not used when executing the encrypted program and may be deleted in conversion 2. The jump instruction 502 is positioned at the beginning of the inserted function 500 so that the data 504 to data 508 is not executed as instructions. A code 512 for calling the function that has had its function name replaced is then positioned after the decryption code 510.

The arrangement or sequence of the jump instruction 502, data 506 to data 508, code 510, and code 512 is not limited to the example shown provided they are positioned with their respective predetermined relationships to the position (address) of the mark 504 as reference. (However, the arrangement of the decryption code 510 and the function call instruction 512 requires that the instruction 512 be executed after the decryption code 510.)

Furthermore, "conversion 1" also creates a relocation table 520 to be attached to the inserted function 500. In addition to the normal relocation information, the relocation table 520 includes a data entry 522 and a data entry 524. The data entry 522 is written with data so that the linker 310 inserts the address of the function "funcAX" revealed during linking into the fixed data area 508 within the inserted function 500. Furthermore, the data entry 524 is set with data so that the linker 310 writes the address of the function "funcAX" into an operand of the instruction code 512, which calls the function "funcAX". These addresses may be appropriately specified using relative addressing or absolute addressing as needed. A specific example of the data entry 522 and the data entry 524 for the relocation table is shown in the following table.

TABLE 1

| Offset | Type | Applied To | Index | Name |
|---|---|---|---|---|
| 00000012 | REL32 | 00000000 | 13 | _funcAX |
| 00000056 | REL32 | 00000000 | 13 | _funcAX |

This example is in the COFF (Common Object File Format) format utilized by Microsoft Visual Studio (registered trademark). The first line of the table shows the data item headers and is not the content of the table. The second line corresponds to the data for the data entry 522 and the third line corresponds to the data for the data entry 524. The "Offset" data item is a value expressing the location where an address is to be written as an offset (relative position) from the beginning of the function. "Type" is the type of address to be written and in the above example ("REL32") indicates that a 32-bit relative address is to be written. "Applied To" indicates the data at the write destination (data within fixed data area 508 and operand of call instruction 512). These items do not represent data within the relocation table. The "Index" is an index (entry number of a symbol table) of the symbol name of data at the address to be written and indicates the function "funcAX" in this example. The "Name" displays the symbol (here, the function name) indicated by "Index" by referencing the symbol table and does not actually exist in the relocation table.

In the example of Table 1, "00000012" indicates that the position of the fixed data area is 0x12 bytes from the beginning of the function and "00000056" indicates that the operand for the funcAX instruction is 0x56 bytes from the beginning of the function. Furthermore, the "13" of Index assumes that the symbol of the funcAX has been allocated with index number 13. In this manner, the relocation table is composed of triplet entries of the write destination offset, type of address to be written, and the symbol (index) of the data at the address to be written.

Figure 6:
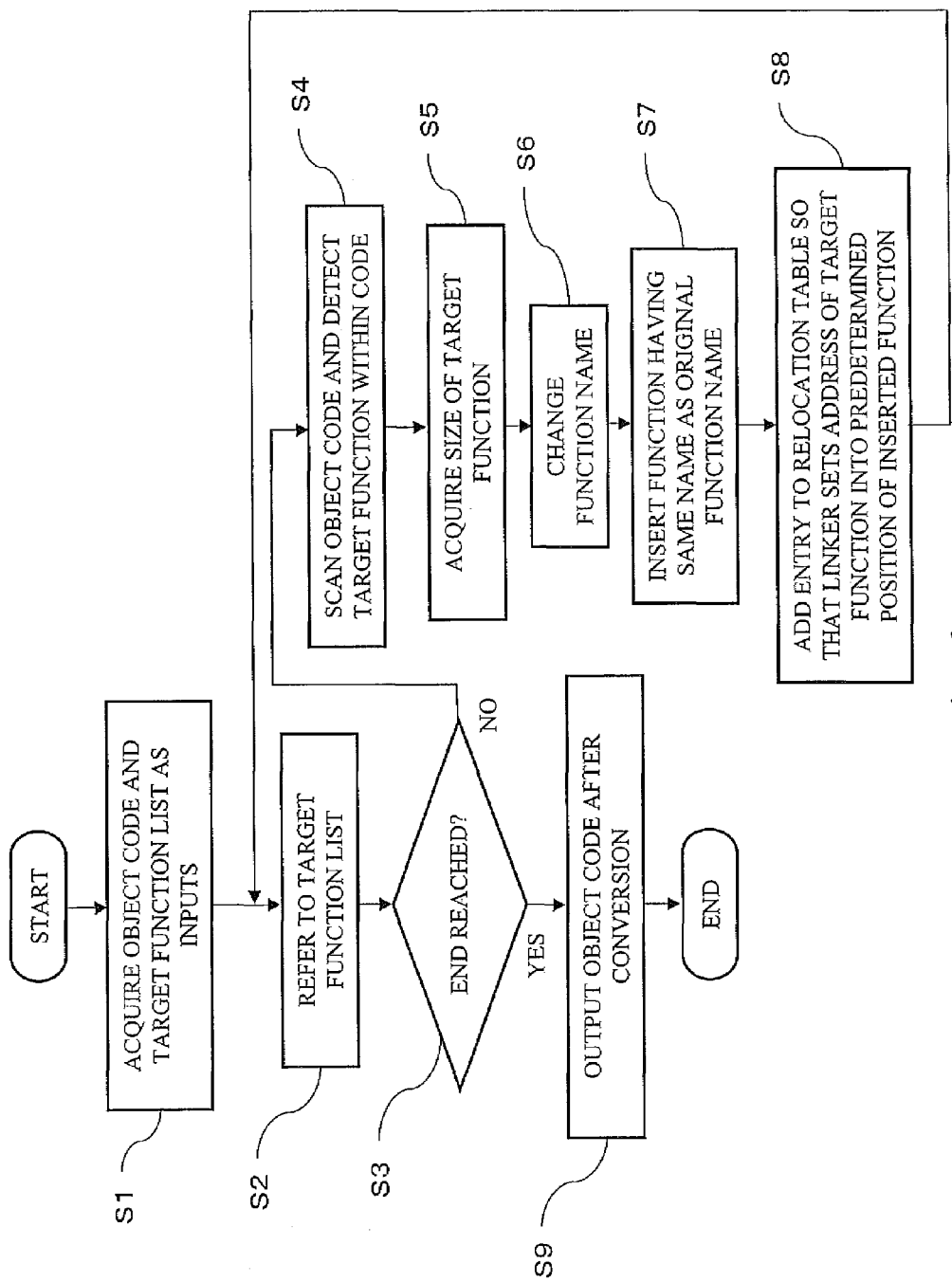
FIG. 6 shows an example of a procedure for the first converter.

An example of the procedure for "conversion 1" that is performed by the first converter 308 will be described in detail with reference to FIG. 6.

First, the first converter 308 accepts as inputs (S1) the object code 304 (namely, 420) that is output by the compiler 302 and the target function list that is created by the target function designation module 306. The first converter 308 next extracts (S2) one target function from the list of target functions. If the end of the function list is not reached (namely, if a function can be extracted from the list in S3), the execution proceeds to step S4.

In step 4, the object code 304 is scanned and the target function that was extracted in step S2 is detected. In more detail, the symbol corresponding to the function name of the target function is detected from a symbol table within the object code 304 and the code position within the object file corresponding to the symbol is read from the symbol table. The code position is expressed, for example, by a combination of a section number within the object file and an offset from the beginning of that section. As a result, the target function can be detected.

The first converter 308 next obtains the size (data size) of the target function in step S5. Then, in step S6, the function name of the target function is changed to another function name that does not coincide with another name. Namely, a symbol for the function name that was changed by adding a specific character string is added to the symbol table and the symbol name pointing to the function definition of the function becomes symbol name that was newly added.

The first converter 308 next inserts the inserted function 500 having the function name of the original target function into the object code 304 in step S7. Namely, the function definition of the new function (inserted function 500) with the symbol name indicating the function name of the original function is added. The data 506 for the size of the target function is the only part in the inserted function 500 that is dependent on the target function. If this is obtained in step S5, the inserted function 500 can be created. In step S8, the data entry 522 and the data entry 524 of the relocation table are added to a predetermined position of the inserted function 500 so that the linker 310 can set the address of the target function. The execution then returns to step S2.

The processing for steps S2 to S8 is repeated until the processing for all functions in the target function list completes. When the end of the list is reached (S3), the processing for conversion 1 completes and the first converter 308 outputs (S9) the conversion result as data (object code 430) conforming to the object code format. As a result, the processing for "conversion 1" terminates.

Returning to the description of FIG. 4, the object code 430 generated by "conversion 1" is linked with other necessary functions by the linker 310. The processing of the linker 310 determines the address of the function "funcAX", the address is set into the fixed data area 508, and the address is further set as an operand of the call instruction code 512. In an executable code 440 that is output by the linker 310, a code for the target function is written in plain text machine code after an instruction 442 for calling the inserted code of the inserted function 500 followed by an inserted code of the inserted function 500 (434). It should be noted that placing the code 444 for the target function after the call instruction 442 is only one example. In actuality, the code execution sequence is appropriately determined by the linker so that the call instruction 442 and the target function code 444 may have any arrangement.

Figure 7:
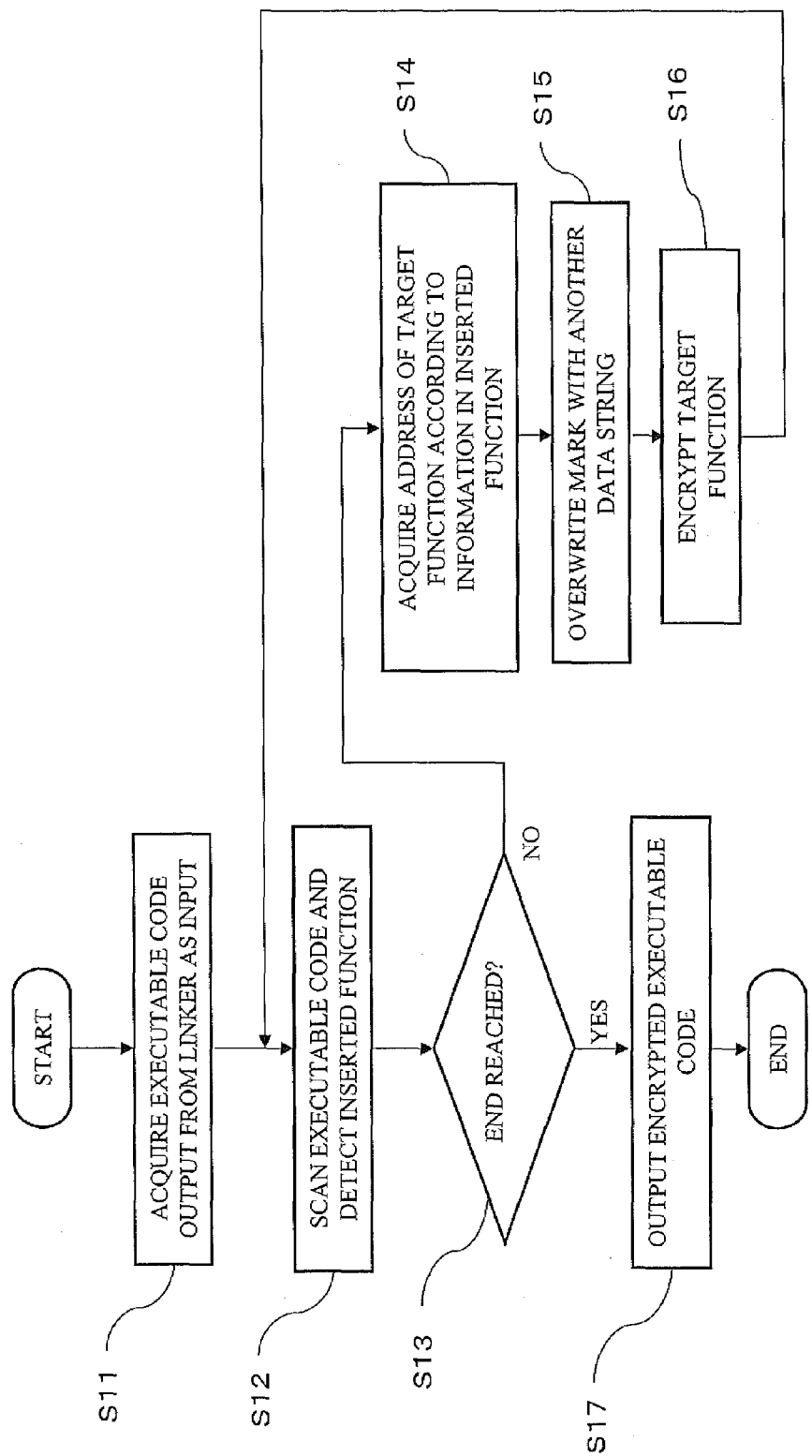
FIG. 7 shows an example of a procedure for the second converter.

The executable code 440 is passed to the second converter 312. The second converter 312 specified the range of the code 444 to be protected on the basis of data of the inserted code 446 in the executable code 440 and encrypts the code 444. This procedure will be described with reference to FIG. 7.

In this procedure, the second converter 312 first inputs and accepts (S11) the executable code 440 in plain text that is output by the linker 310. Next, the executable code 440 is searched with the mark 504 that was embedded in "conversion 1" as a key to detect (S12) the inserted function 500. If the inserted function 500 is found (S13) before the end of the executable code 440 is reached, the addresses of data 506 and the data 508 are identified with the mark 504 as reference, from which the size (data 506) and address (data 508) of the target function corresponding to the inserted function 500 are respectively acquired (S14). The second converter 312 then overwrites (S15) another data string on the mark 504 so as to delete the detected mark 504. This is done to prevent the mark 504 from being used as a clue for analysis if an encrypted executable code 450 is analyzed. Traces of marks can be concealed by overwriting each mark position in the executable code with unpredictable and mutually different data strings, such as random numbers. Then, using a predetermined encryption algorithm, the second converter 312 encrypts (S16) the range (namely, the code section for the target function) in the executable code 440 indicated by the address and size that were acquired in step S14. Thereafter, the execution returns to step S12, and the processing for steps S12 and S13 is repeated until the end of the executable code 440 is reached. When it is judged in step S13 that the end of the executable code 440 has been reached, the created executable code 450 is output (S17) at this time.

In the executable code 450 that is created by the processing of the second converter 312 are positioned an instruction 452 for calling decryption code and an encrypted code 454 for the target function followed by a decryption code 456 and in turn followed by an instruction for calling the encrypted code for the target function 454. The call instruction 452 and the code 454 may have any arrangement and is not limited to the sequence shown in the figure. If the computer system executes the executable code 450, the decryption code 456 is first called by the function "funcA" and executed after which the encrypted code 454 of the target function is called. As a result, the encrypted code 454 is decrypted and then executed.

According to the above-mentioned example, the encryption is specified and performed in function units. This greatly reduces a problem of the related art where other code that has strayed into the code to be encrypted is also encrypted. Furthermore, in the related art, the function of an inline assembler is necessary in the program development environment to insert decryption codes and marks into the source code. However, in this embodiment, the target function need only be specified and the target function designation module 306 is available for this purpose so as to be ideal for environments without an inline assembler. Furthermore, in this example, the source code itself is not modified to yield an advantage of improved maintainability of the source code.

Moreover, if multiple functions within one program are to be protected, the decryption codes that are inserted by the first converter 308 or the second converter 312 may have mutually different codes in the target functions. For example, multiple decryption codes that the same decryption algorithm expresses in different codes or multiple decryption codes corresponding to different encryption algorithms may be used. In the latter case in the configuration where decryption codes are inserted by the first converter 308, processing is necessary for the second converter 312 to properly encrypt the sections corresponding to the respective decryption codes. Several methods can be used, for example, the first converter 308 can be applied to different decryption codes in a predetermined sequence and the second converter 312 can apply encryption algorithms corresponding to the respective decryption codes according to that sequence, or the first converter 308 can write data indicating the decryption coding corresponding to the matching encryption algorithm and the second converter 312 can interpret the data and apply the appropriate encryption algorithm.

Furthermore, code for re-encrypting a target function can be added after the call instruction 512 for the target function within the inserted function 500. By doing this, after the target function has been decrypted at the execution of the encrypted executable code and then executed, the processing returns to the inserted function 500 and re-encryption of the executed target function is performed. As a result, the contents of the main memory can be hidden even if the target function remains after execution. Although information specifying the range of memory addresses to be encrypted is necessary in the code for re-encryption, the linker 310 can resolve this range by using such information as the size data 506 of the target function and the address data (data to be written by the linker 310 into the fixed data area 508).

Figure 8:
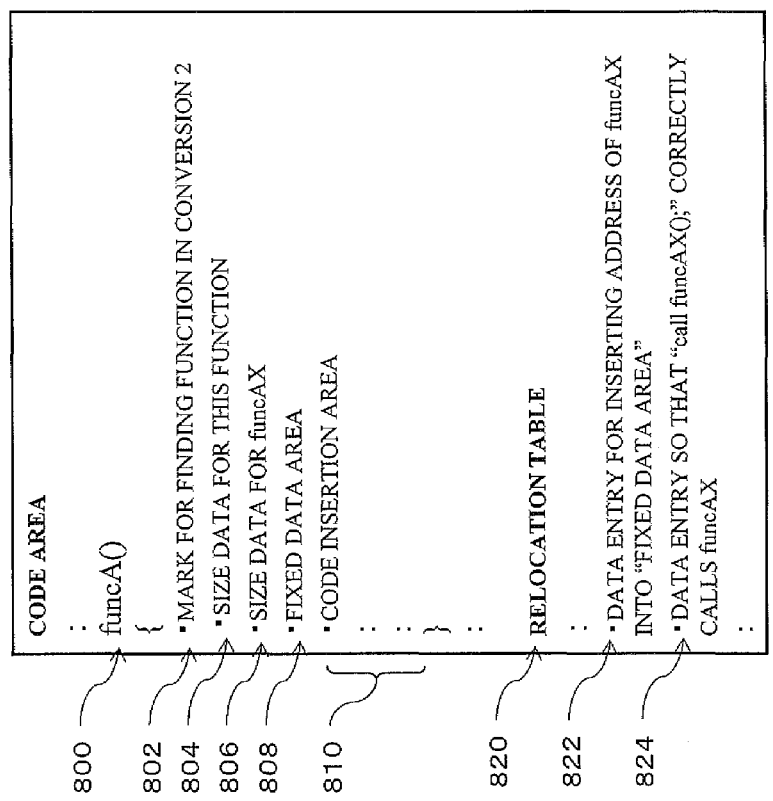
FIG. 8 schematically shows another example of the contents of the inserted function.

Next, another example of an inserted function to be inserted into the object code 304 by "conversion 1" will be described with reference to FIG. 8.

A mark 802, data 806 and data 808 in an inserted function 800 may be respectively identical to the mark 504, the data 506, and the data 508 in the inserted function of FIG. 5. Furthermore, a data entry 822 and a data entry 824 to be added to a relocation table 820 may be respectively identical to the data entry 522 and the data entry 524 within the relocation table 520 of FIG. 5. The differences with the inserted function 500 of FIG. 5 are that the inserted function 800 includes data 804 indicating the size of the inserted function 800 itself and that instead of the decryption code 510, an area 810 for subsequent decryption code insertion is reserved.

The data 804 indicating the size of the inserted function 800 itself is utilized when encrypting part of the inserted function 800 itself. Namely, when the data, such as codes, included within the inserted function 800 is analyzed, the security of the encrypted code can be threatened. Thus, the sections besides those in the inserted function that are required to be in plain text (such as data 804 and the codes for decrypting the encrypted decryption codes) can be encrypted. Namely, in this case, a decryption code (referred to as first decryption code) for decrypting the target function and a decryption code (second decryption code) for decrypting the encrypted decryption code are necessary. In this case, for example, the codes are arranged in the sequence of the second decryption code and the encrypted first decryption code. Furthermore, in this case, the data 804 can be used to determine the position of the end of the inserted function so that the decryption process stops at the end of the inserted function during execution.

Moreover, a decryption code (and code to call a decrypted target function) is inserted into the area 810 during the subsequent "conversion 2" process. In this manner, inserting the decryption code in "conversion 2" reduces the chances of the decryption code being viewed in a plain-text state to improve the security of the encrypted code.

Furthermore, encrypting the inserted decryption code section in the "conversion 2" process in this manner enables the decryption code to be protected and the security of the target function to be improved.

It should be noted that a certain amount of protection of the decryption code results simply by reserving the area 810 in "conversion 1" even if encryption of the decryption code is not performed.

Next, an example of strengthening the encryption by applying multiple encryption processes on the target function will be described.

Figure 9:
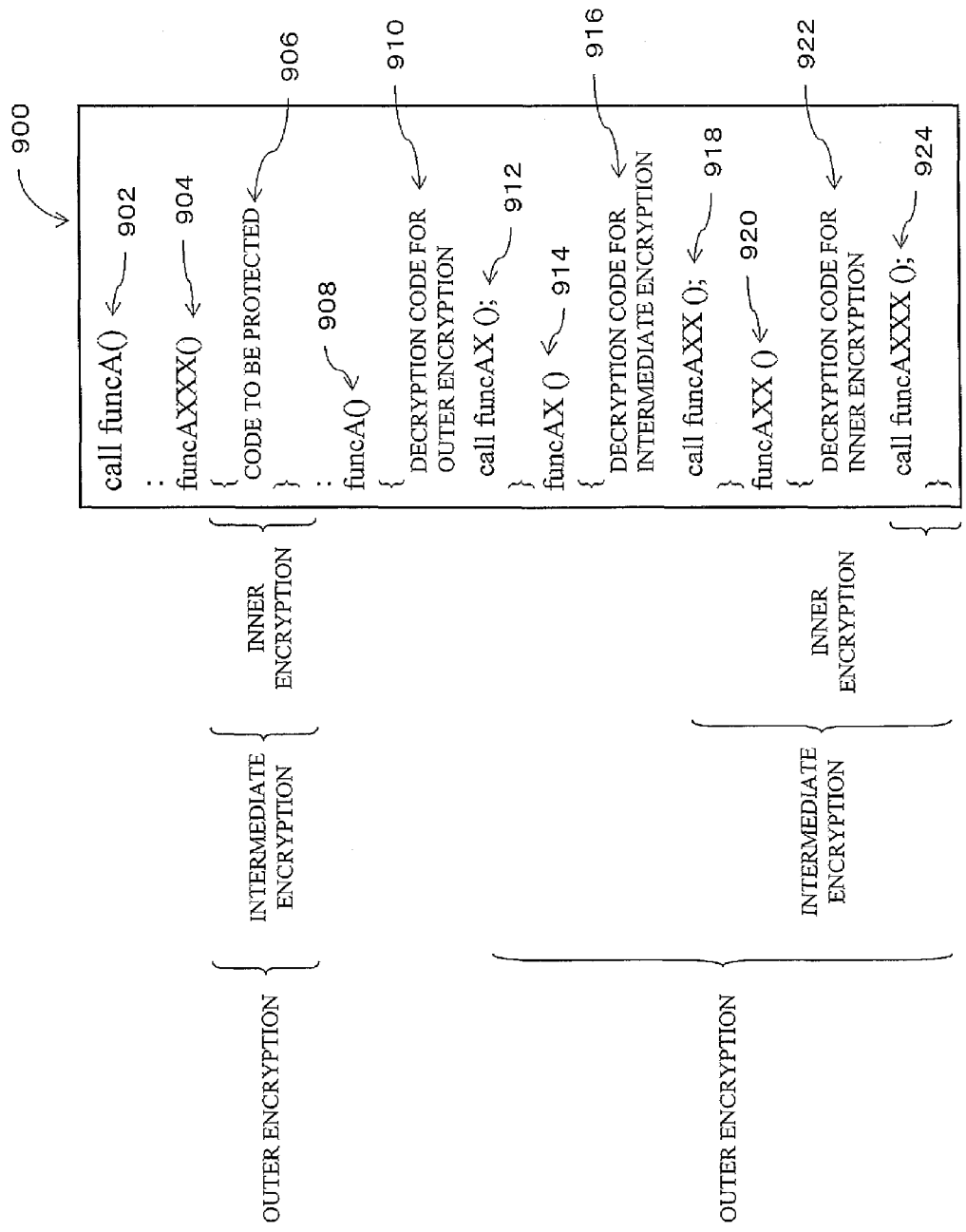
FIG. 9 illustrates an example of multiple encryptions.

FIG. 9 schematically shows an example of a method for inserting a function for decryption as another function for every single encryption process. In this example, triple encryption is performed on a target function "funcA( )" within an executable code 900. In this example, each encryption process is performed, the function name is systematically changed by adding a predetermined character string ("X" in this example) to the end of the function name. Namely, since triple encryption is applied in this example, the target function name changes to a function 904 of "funcAXXX". A decryption function 908 for decrypting the outer encryption among the three encryption processes inherits the same function name "funcA" as that of the original target function. The function 908 includes a decryption code 910 corresponding to the outer encryption and an instruction 912 for calling a decryption function 914 "funcAX" for decrypting the intermediate encryption. The intermediate decryption function 914 includes a decryption code 916 for decrypting the intermediate encryption and an instruction 918 for calling an inner decryption function 920 "funcAXX". The inner decryption function 920 includes a decryption code 922 for decrypting the inner encryption and an instruction 924 for calling the target function 904 "funcAXXX". From the viewpoint of making it difficult to break the encryption, the decryption codes 910, 916, and 922 herein may be mutually different codes. This may be accomplished by expressing the same decryption algorithm as different codes (in this case the inner, intermediate, and outer encryption algorithms are identical). Furthermore, different inner, intermediate, and outer encryption algorithms may be used with the corresponding different decryption codes 910, 916, and 922.

The name changing rule for target functions and the naming rule for the decryption functions at the various steps are not limited to the illustrated examples. Functions can be named according to any rule provided the functions can be uniquely distinguished within the executable code, the outermost decryption function is called by the calling of the target function, and the target function after the name change is called from the innermost decryption function.

To create the executable code 900, the first converter 308 changes the function name at the beginning of the function definition of the target function within the object code according to the rule and creates the outer, intermediate, and inner decryption functions. Although not shown in the figure, each decryption function includes the mark 504, size data 506, fixed data area 508, and relocation table entries 522, 524. The data entries of the relocation table added by the first converter 308 include data so that the addresses decided by the linker 310 for the function names "funcAX", "funcAXX", and "funcAXXX" are set to the necessary locations (the fixed data area 508 and operand of the call instruction 512 as shown in the example of FIG. 5) for the respective object codes. The object code in which the function name has been changed and the outer, intermediate, and inner decryption functions are linked to one executable code by the linker 310, at which time address resolution is performed for the functions "funcAX", "funcAXX" and "funcAXXX".

The second converter 312 detects the decryption functions 908, 914, and 920 from the executable code that was output from the linker 310 and specifies a sequence (inner, intermediate, outer) for the decryption functions from the calling relationship among the functions and specifies the range of the code 906 to be protected. Encryption is then performed in sequence from the inside. The inner encryption is performed on the code 906 to be protected and the instruction 924 for calling the target function 904. The instruction 924 is a typical instruction and the size and position are known since it is created by the first converter 308. Furthermore, as in FIG. 5, the position of the target function 904 and size of the function 920 are included within the code 922 from which the information necessary for encryption can be obtained. Therefore, the second converter 312 may encrypt the range specified by the position of the instruction 924 and the size. The intermediate encryption is performed on the code 906 to be protected (on which inner encryption has been performed) and the instruction 918 for calling the inner decryption function 920 and the inner decryption function 920. Since the first converter 308 creates the instruction 918 and the inner decryption function 920, the position and size are known so they can also be encrypted. The outer encryption is performed on the code 906 to be protected (on which inner and intermediate encryption have been performed), the instruction 912 for calling the intermediate decryption function 914, and the intermediate decryption function 914 and the inner decryption function 920. In the executable code 900 that is created as a result of this process, the decryption code 910 corresponding to the outer encryption is in plain text. However, the decryption code 916 and the decryption code 918 corresponding to the intermediate and inner encryptions are encrypted. Furthermore, the code 906 to be protected is encrypted three times.

When the executable code 900 in which the target function 904 has been encrypted multiple times in this manner is executed on a computer system, the outer decryption function 908 is first called by the call instruction 902 and the outer encryption is decrypted. As a result, the intermediate encrypted decryption code 916 is in plain text. Next, the intermediate decryption function 920 is called and the decryption code 916 in plain text is executed to decrypt the intermediate encryption. Similarly, the inner encryption is decrypted so that the protected code 906 is in plain text and the code 906 is called by the instruction 924 and executed.

Another example of applying multiple encryption processes will be described with reference to FIG. 10. In this example, multiple decryption codes 1010, 1012, and 1014 are included in this sequence for outer, intermediate, and inner within a single decryption function (inserted function) 1008. A target function 1004 that includes a code 1006 to be protected is changed to the function name "funcAX" to differ from the original function name "funcA", and the decryption function 1008 is given the original function name "funcA". The contents and size of the decryption codes 1010 to 1014 are known by the first converter 308 (or can be obtained from information written within each decryption code similar to the example of FIG. 5). Therefore, the first converter 308 embeds the decryption codes so that the inner decryption code 1014 is encrypted with the intermediate encryption process and the intermediate decryption code 1012 is encrypted with the outer encryption process. The second converter 312 encrypts the code 1006 to be protected and an instruction 1016 for calling the target function 1004 with the inner encryption process, encrypts the encrypted result and the inner decryption code 1014 with the intermediate encryption process, and encrypts the encrypted result and the intermediate decryption code 1012 with the outer encryption process.

When the executable code 1000 that has been created in this manner is executed on a computer system, the decryption function 1008 is called by the instruction 1002 for calling the target function 1004 and the outer decryption code 1010 is first executed to decrypt the outer encryption. The intermediate decryption code 1012, which has become plain text as a result, is executed to decrypt the intermediate encryption. Then, the inner decryption code 1014, which has become plain text as a result, is executed to decrypt the inner encryption so that the instruction 1016 and the protected code 1006 become plain text. Thereafter, the instruction 1016 is executed so that the protected code 1006 is called and executed.

Figure 10:
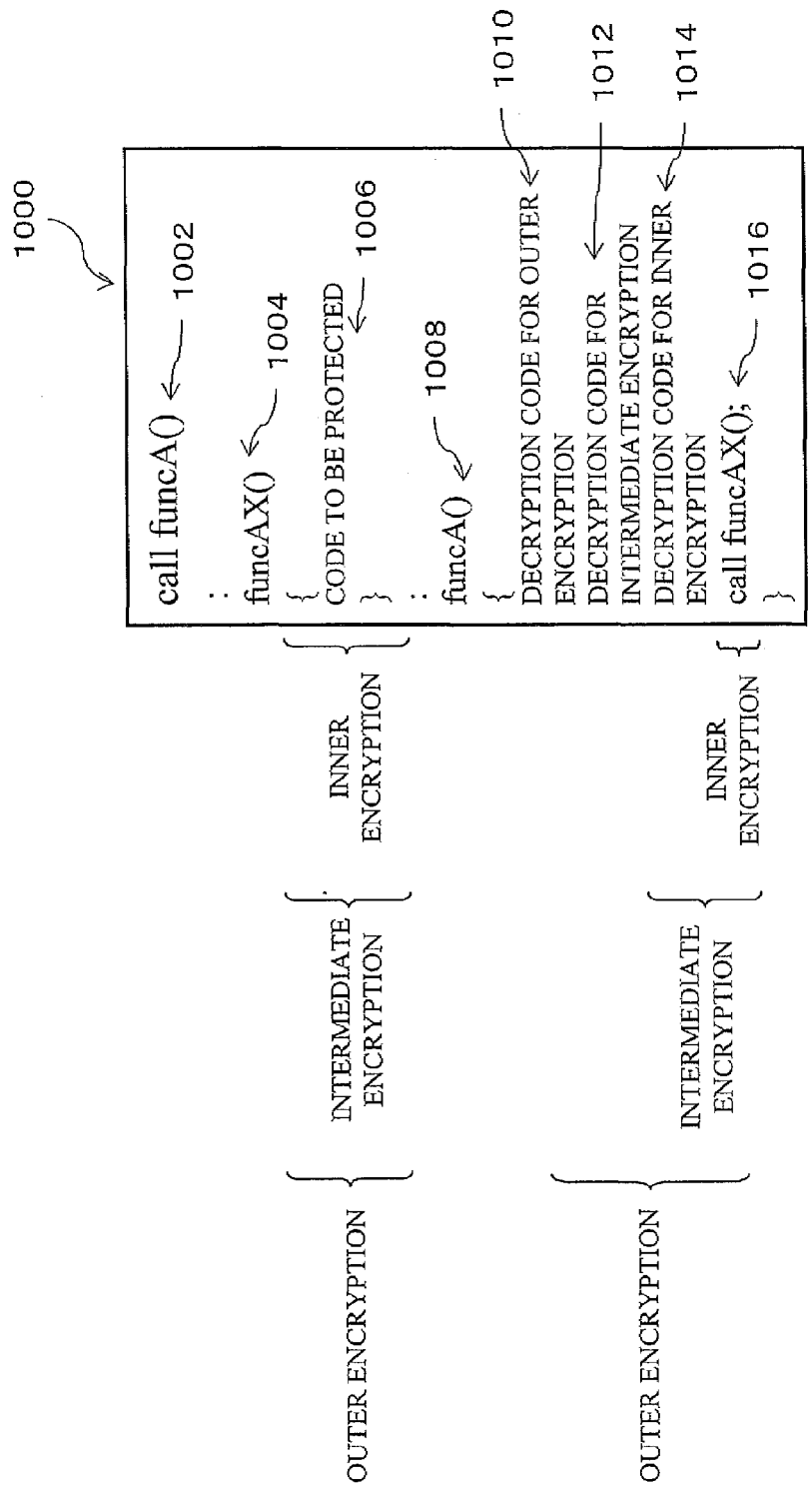
FIG. 10 illustrates another example of multiple encryptions.

As shown in the examples of FIG. 9 and FIG. 10, multiple decryption codes are prepared and the encryption corresponding to each decryption code in sequence from the inner decryption code results in the other decryption codes being encrypted in sequence in a nested manner. Thus, most of the sections of code for decrypting the target function can be encrypted. This can achieve a protection having a higher resistance to analysis.

In the examples of FIG. 9 and FIG. 10, inner, intermediate, and outer encryption processes were performed on the codes 906 and 1006 to be protected. However, instead of this, inner encryption only may be performed on the code to be protected and the decryption code for decrypting the inner encryption may be protected by the intermediate and outer encryption.

Furthermore, in the above-mentioned examples, the target function designation module created a list of target functions in accordance with user designation and the first converter 308 changed the function name of the target function on the basis of this list. However, this is not an essential requirement. Instead, the user (programmer) may change the target function name within the source code by adding a predetermined qualifier. In this method, the user uses an editor to add a qualifier to the function name of the function definition of a function to be protected within the source code according to a predetermined rule. For example, a predetermined character string of "_x" is added to the end of the function name "funcA" to change it to "funcA_x".

However, so that the changed function name is unique within the program, it is conceivable that there may be a necessity to add a long and complex qualifier string, which is difficult for the user to remember, input or read and recognize afterward. To assist in the name changing process, a preprocessor macro function may be used to preprocess the source code. Namely, in this case, the user creates and adds a macro to the source code for replacing a qualifier, which is easy to understand and relatively easy to input by the user, with a qualifier, which is easy to recognize by the computer and has a high probability of being unique. The user then adds a human-oriented qualifier to the function name of the definition of the target function within the source code using an editor. If this source code to which qualifiers have been added is processed by the preprocessor, the function names of the definitions of the target functions can be changed to names with computer-oriented qualifiers. At this time, if a function name that has been changed by adding a qualifier happens to coincide with the function name of another function, the preprocessor detects the duplication and issues a warning so that in response the user can change the human-oriented qualifier and provide another one to the function name of the target function. Furthermore, when the qualifiers are provided by a macro as in this example, deleting or modifying the macro allows the qualifiers up to that point to be cleared. Therefore, an advantage is that this facilitates the task of switching to enable or disable protection when specifying multiple functions for protection.

In this case, the target function designation module 306 in the system of FIG. 3 becomes unnecessary. The first converter 308 creates the inserted function but does not need to change the function name. In the creation of the inserted function, the first converter 308 searches the object code 304 for the definition of a function having a predetermined qualifier (computer-oriented qualifier) corresponding to the target function and deletes the qualifier from the function name of the function definition to yield the function name of the inserted function. The contents of the inserted function may be identical to the above-mentioned example. The linker 310 and the second converter 312 may also be identical to the example of FIG. 3.

If the programmer changes the function name of the target function in the source code in this manner, the encryption can be easily switched between enable and disable and the function name can be qualified while maintaining the ease of debugging, modification, and maintenance of the source code. Furthermore, in the example of FIG. 3, a side-effect that cannot be anticipated by the programmer may possibly occur since the first converter 308 automatically changes the function name of the target function. However, in a method where the programmer changes the necessary function names, the risk of an unexpected side-effect can be reduced.

In the method where the user changes the function name of the target function within the source code, the modifying of the source code by the user conforms to the related art with the following difference. Namely, since the inside of a function is modified in the related art by inserting a decryption code or decryption function into the function within the source code, the compiler optimization adds unexpected changes to the execution sequence of the code to result in operations differing from the intended operation. In comparison, this sort of problem does not easily occur in the method of the embodiment since only the function name of the function definition is changed.

Next, the passing of function arguments when the encrypted target function 432 is called from the inserted function 434 will be described in a case where the encrypted executable code 314, which was created by the apparatus of FIG. 3 and FIG. 4, is executed on a computer system.

In the apparatus of FIG. 3 and FIG. 4, the inserted function 434 is called by the call instruction 430, which originally called the target function 432. Thus, the function arguments specified in the call instruction 430 are passed to the inserted function 434. After the inserted function 434 is executed and the encrypted target function 432 is decrypted, it is necessary for these arguments to be correctly passed to the decrypted target function 432.

Some arguments are set into registers and others are pushed into stacks. For an argument set into a register, if the register being used is destroyed within the inserted function, the value of the register prior to destruction can be saved to another location (such as data area in main memory or in a stack in the form of a local variable) and the saved value need only be set again into the same register immediately prior to calling the target function. The inserted function 434 is included with code for saving to and restoring from the register.

Figure 11:
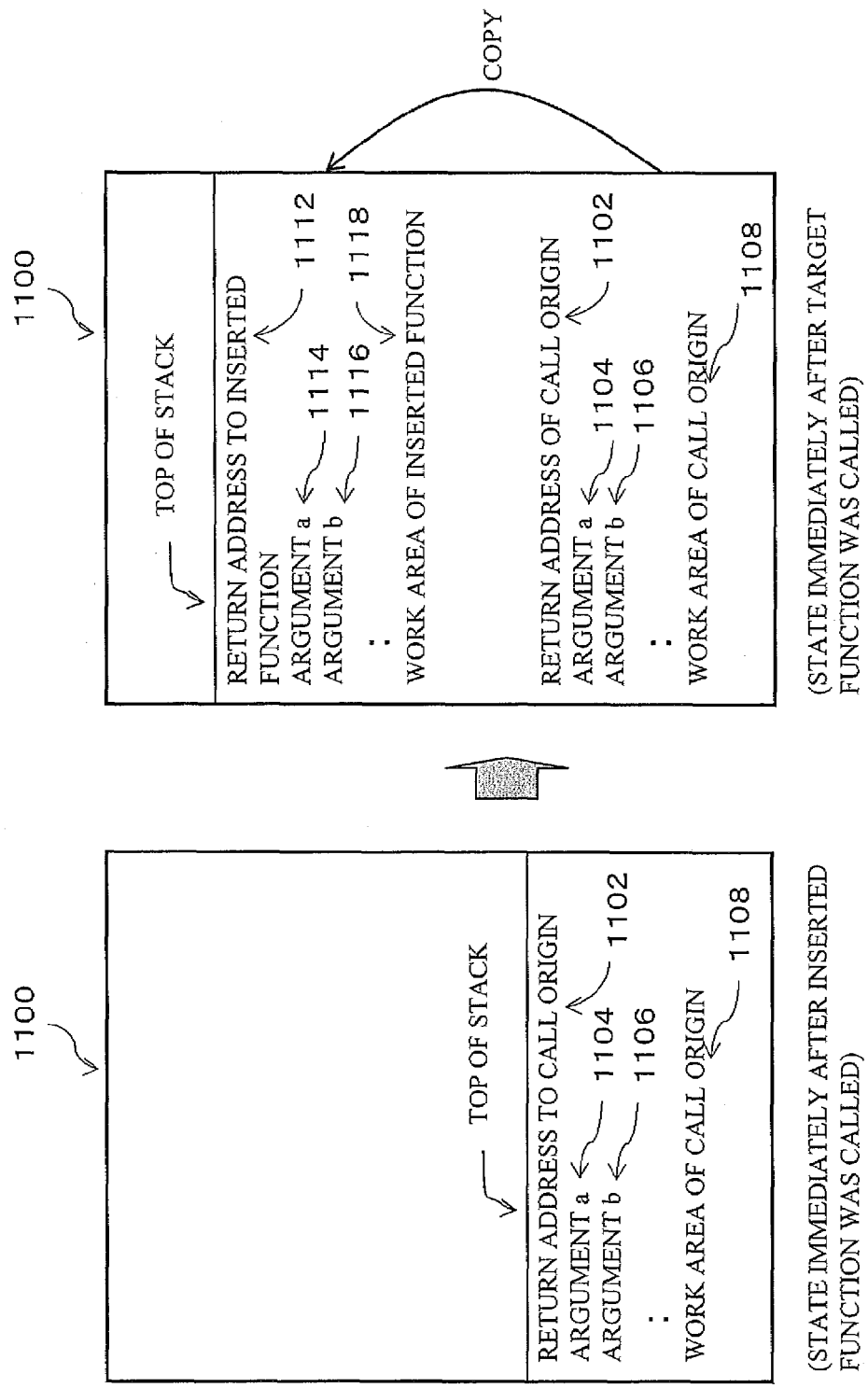
FIG. 11 illustrates one example of a method for passing arguments between the inserted function and the target function.
Figure 12:
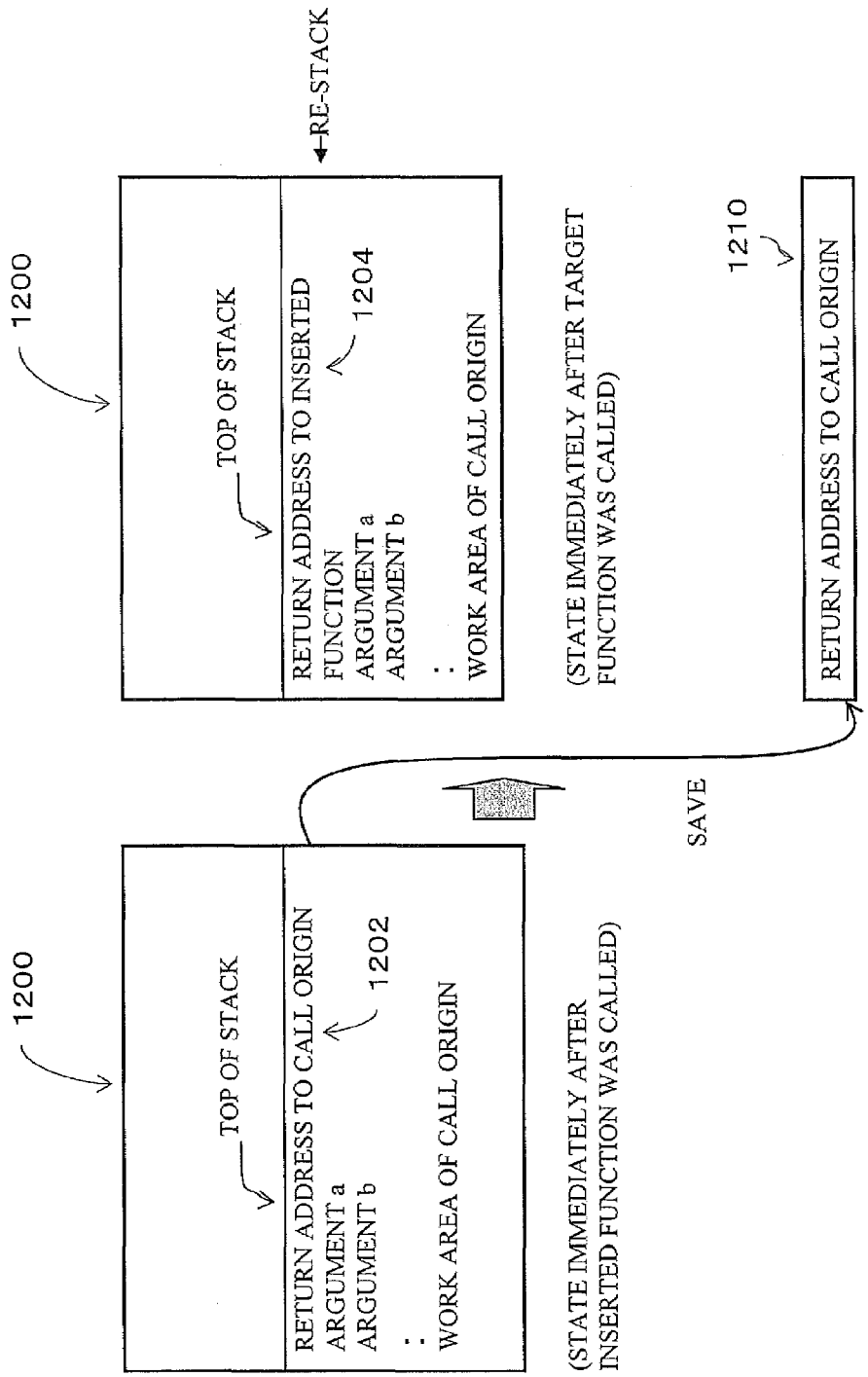
FIG. 12 illustrates another example of a method for passing arguments between the inserted function and the target function.

Furthermore, methods of passing an argument pushed onto the stack are shown in FIG. 11 and FIG. 12.

In the example of FIG. 11, an argument for the inserted function is copied and newly pushed onto the stack. As shown in FIG. 11, immediately after the inserted function has been called, the top of a stack 1100 stores a return address 1102 to the call origin, an argument a 1104, an argument b 1106, and so forth, and a work area 1108 at the call origin. Thereafter, at the step where the inserted function is executed and the decrypted target function is called, with the original stack contents remaining, a work area 1118 for the inserted function is pushed onto the top of the stack 1100, the argument a 1104, argument b 1106, and so forth, are copied and pushed as an argument a 1114, an argument b 1116, and so forth. At this time, when the target function is called, a return address 1112 to the inserted function is pushed. By doing this, the target function that was called from the inserted function uses the arguments a, b, and so forth, specified at the call origin and performs calculations. In order to accomplish this, the first converter 308 includes code for copying the contents of the stack to the location prior to calling the target function within the inserted function to be created so that the arguments can be passed to the target function. When a call instruction is executed in the widely available Pentium (registered trademark) processor from the Intel Corporation, a return address is automatically pushed onto the stack so that the code to be included in the inserted function may indicate a process to push data other than the return address 1112 to the inserted function.

A compiler, for the C++ language, for example, performs name qualification by adding information, such as arguments, to function names so that the number of arguments is known from the qualification information and the data size of each argument can be known. Therefore, the first converter 308 can judge how much to copy from the top of the stack.

In the method of FIG. 12, the arguments for the inserted function are not copied and newly pushed onto the stack. Instead, the original stack contents are maintained and used for the inserted function. In the example of FIG. 12, a stack 1200 immediately after the inserted function has been called is identical to the case of FIG. 11. At the step where the inserted function is executed and the decrypted target function is called, a return address 1202 to the call origin is saved to a safe save area (1210). For the save area 1210, a data area in memory, a register that will not be destroyed, or a location (such as one set aside together with the fixed data area 508 area in FIG. 5) that is prepared in a data area or code area in the main memory can be used. Calling the target function causes a return address 1204 to the inserted function to be pushed. When the execution of the decrypted target function ends and the processing returns to the inserted function, the return value from the target function is maintained and the processing jumps to the return address 1202 to the call origin in the save area 1210. This jump can be achieved by using a branch instruction. Furthermore, another method is to push the return address of the save area 1210 onto the top of the stack and then execute the return instruction (such as ret instruction) from the inserted function. To accomplish this, the first converter 308 incorporates a code for saving the call origin address 1202 before the instruction for calling the target function within the inserted function to be created, and incorporates a code to cause the processing to jump to the return address to the saved call origin after the instruction for calling the target function.

Furthermore, for the calling configuration of a program function within the executable code generated by the linker, there are generally two methods: direct calling of a function and calling of a function via a jump table. It is possible to combine these methods in a single program. In the case of calling via a jump table, the above-mentioned function call instruction points to one jump instruction in a jump table. Therefore, as in the conversion process illustrated in FIG. 4 where the destination pointed to by the call instruction is encrypted, the jump instruction may become encrypted. However, the body (function definition) of the function at the jump destination is what should be encrypted and not the jump table. Thus, when the address of the target function is acquired in "conversion 2" and there is a jump table at the address, it is necessary to find and encrypt the code of the function body at the jump destination.

Figure 13:
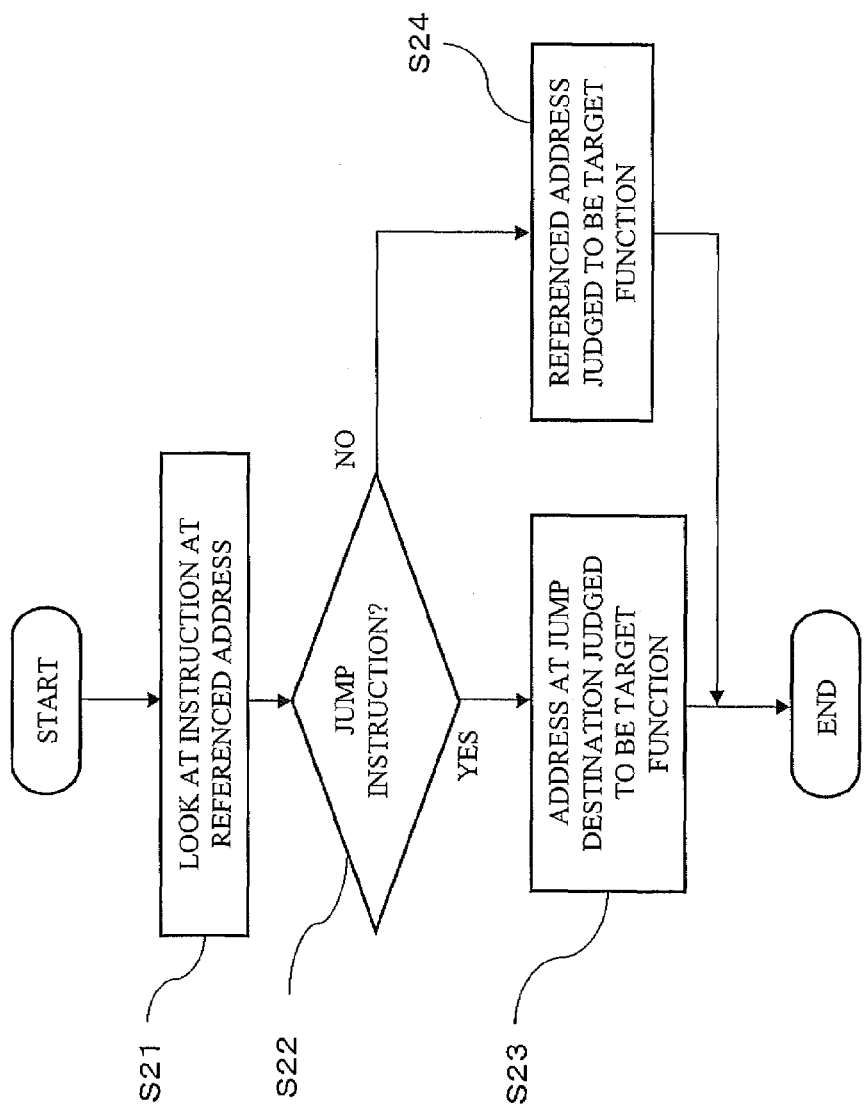
FIG. 13 shows an example of a procedure for "conversion 2" when taking into consideration a function call via a jump table.

For this reason, for convenience, the second converter 312 examines the instruction at the referenced address (namely, the address set by the linker 310 into the fixed data area 508) as shown in FIG. 13. If the instruction is not a jump instruction (S22), it is judged that the referenced address points to the target function (S24) and encryption is performed starting from that address. On the other hand, if the instruction at the referenced address is a jump instruction (S22), it is judged that the address of the jump destination indicated by the instruction is the beginning of the target function (S23) and encryption is performed starting from that address. This method is based on the fact that compared to an entry in the jump table being a jump instruction, a jump instruction at the beginning of the function body is rare.

Figure 14:
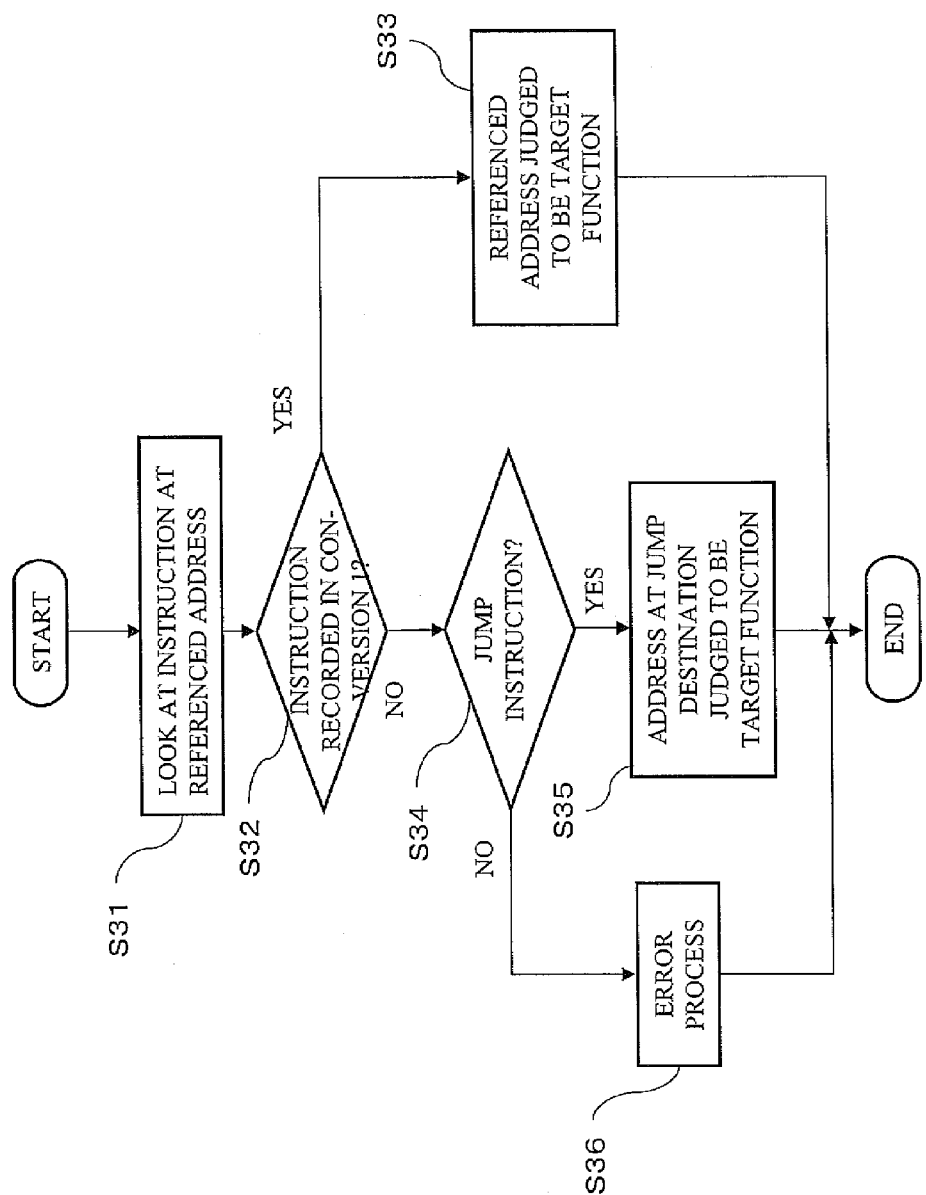
FIG. 14 shows another example of a procedure for "conversion 2" when taking into consideration a function call via a jump table.

However, it is possible for a jump instruction to be at the beginning of a function definition. Taking this rare instance into consideration, the following processing can be devised. Namely, in this processing method, the first converter 308 copies and stores into a target function database the body of the target function specified by the user (such as a predetermined number of instructions at the beginning of the function) in whole or in part, which the second converter 312 references. From the information provided by the target function designation module 306, the first converter 308 can determine which function body is to be protected and can acquire information on that function body. Part of the target function body to be stored may be a code of a predetermined size at a predetermined position (such as beginning) in the body and may be a hash value of the target function body. As shown in FIG. 14, the second converter 312 examines the instruction at the referenced address (S31) and judges whether or not the instruction is the same as the one registered in the target function database (S32). If the instruction is registered, it is judged that the referenced address points to the target function (S33) and encryption is performed starting from that address. If the instruction is not registered, it is judged whether or not the beginning of the code pointed to by the referenced address is a jump instruction (S34). If the beginning of the referenced address is a jump instruction, the address at the jump destination of the instruction is judged (S35) to be the beginning of the target function and encryption is performed starting from that address. If it is not a jump instruction and the target function is not at the referenced address, there is also no instruction for jumping to the target function so as a result the correct target function is not found. In this case, a predetermined error processing(error handling) is executed (S36) when the correct target function is not found.

In the above-mentioned examples, encryption was used as a method for protecting a target function. However, the protection of functions is not limited to encryption. For example, a protection method can be devised to prevent or inhibit a target function from being analyzed with tools, such as a debugger. One protection method, for example, is to include into a program an analysis prevention function which describes a process for detecting that analysis is being performed by such a tool and a process to disable the analysis of the target function if the tool is detected by stopping the execution of the tool.

Figure 15:
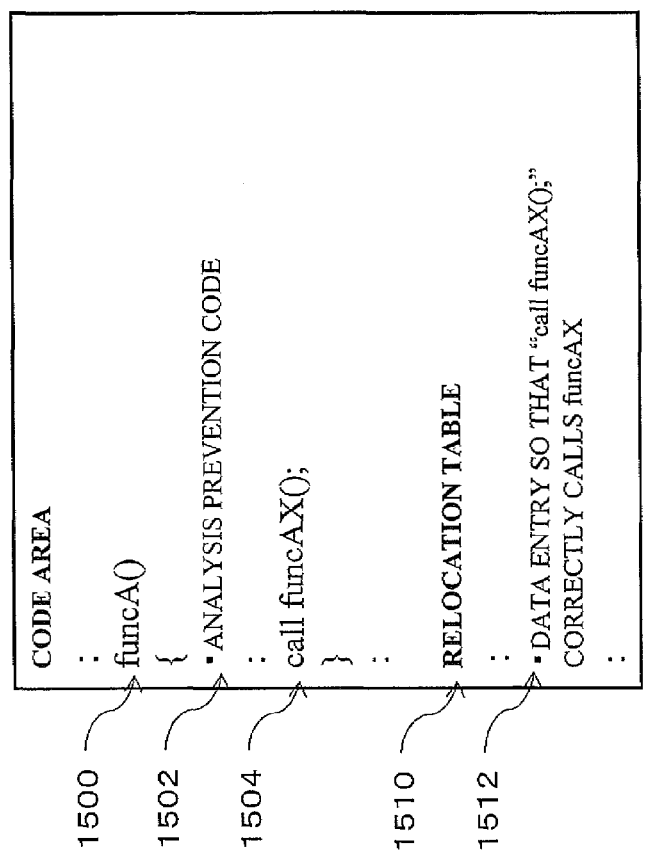
FIG. 15 shows an example of an inserted function for preventing code analysis using a tool, such as a debugger.

Namely, in this example, the function name of a target function is changed and an inserted function 1500 shown in FIG. 15 is created having an original function name "funcA" of the target function. As described above, the inserted function 1500 includes an analysis prevention code 1502 in which are written a process for detecting that analysis is being performed by a tool and a process for stopping the execution of the tool if it was detected that analysis is being performed. If analysis is not being performed, the process for stopping the tool is not executed, the execution of the analysis prevention code 1502 ends, and an instruction 1504 for calling the corresponding target function "funcAX" is executed. In order for the instruction 1504 to function as a correct call instruction, a relocation table 1510 attached to the inserted function 1500 includes a data entry 1512 so that the target function "funcAX" is set into the operand by the linker. A system for applying this sort of protection on a program will be described with reference to FIG. 16.

Figure 16:
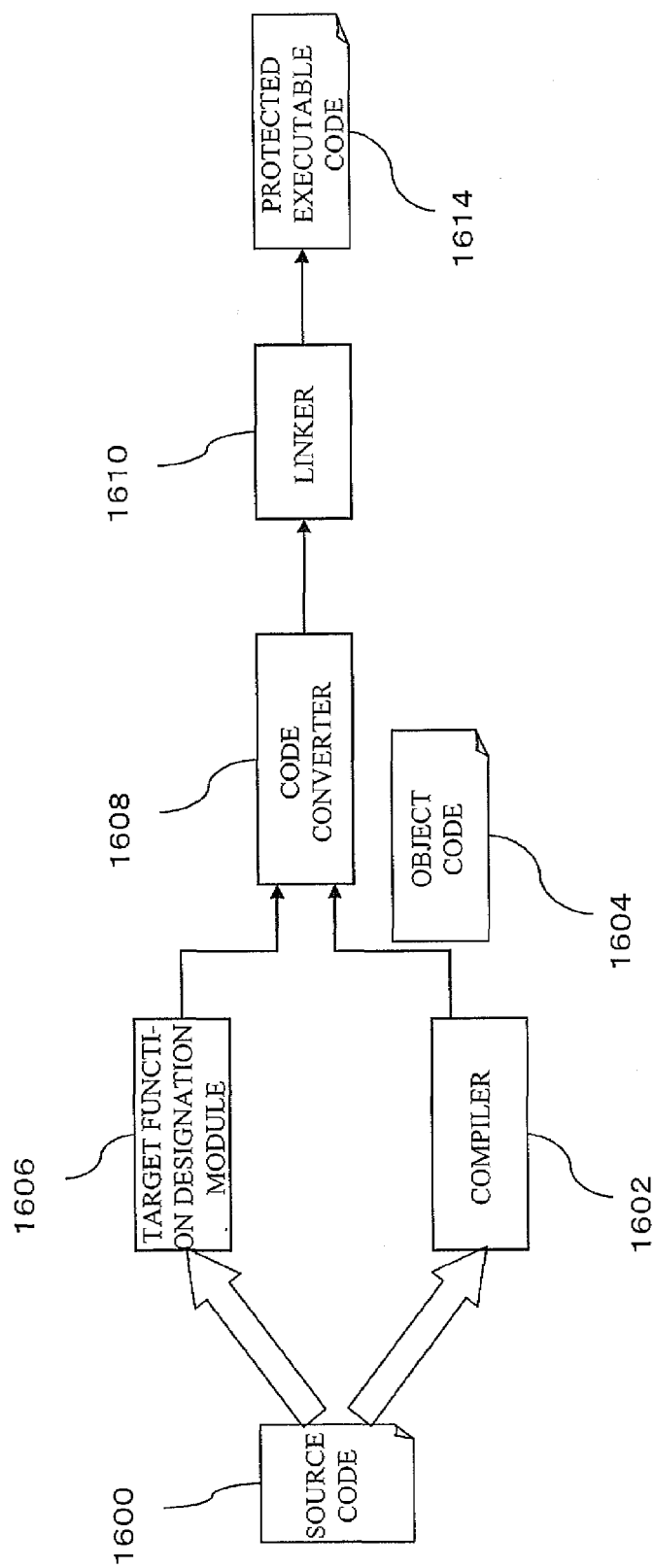
FIG. 16 shows an example of a system providing protection against code analysis using a tool, such as a debugger.

In the system of FIG. 16, a compiler 1602 and a linker 1610 may be those of the prior art. The compiler 1602 converts a source code 1600 into an object code 1604. A target function designation module 1606 operates in the same manner as the target function designation module 306 in the system of FIG. 3 and the user uses the target function designation module 1606 to specify functions to be protected. A code converter 1608 performs a process similar to the first converter 308 in FIG. 3 and converts the function name of the function body of each target function within the object code 1604 and inserts the inserted function 1500 having the original function name of each target function into the object code 1604. The linker 1610 links the inserted function 1500, object code 1604, and other library functions, and performs the necessary processes at this time, such as address resolution. This linking process generates a protected executable code 1614. When the protected executable code 1614 is executing normally, the target function also is executed. On the other hand, if execution is performed during analysis with an analysis tool, the inserted function 1500 detects the analysis and control is performed, such as by immediately stopping execution, so that the analysis tool does not proceed to the target function. As a result, the target function can be prevented from being loaded into the analysis tool.

Examples of protecting target functions were described above illustrating encryption and protection against debugger-based analysis. However, there are various methods of protecting target functions and the method described using FIG. 15 and FIG. 16 is applicable to various methods.

Although a preferred form of the present invention has been described in its form with a certain degree of particular-ity using specific examples, it is to be understood that the invention is not limited thereto. It is further understood by those skilled in the art that various changes and modifications may be made in the invention without departing from the spirit and scope thereof.

What is claimed is:

1. A portable recorded storage medium readable by a computer, the storage medium storing a program of instructions executable by the computer to perform a function for protecting a target function, the function comprising:
   generating an inserted function, having a function name identical to the function name of the target function, that includes code for a process relating to protection of the target function and a call instruction for calling the target function after the process, the inserted function including a reserved area and first relocation information for having a linker execute a process to write an address of the target function to an operand for the call instruction; and
   generating a protected executable code on the basis of an object code, in which the function name of a function definition of the target function has been changed to a second function name, and the inserted function;
   the process generating the protected executable code including having the linker link the inserted function and the object code, in which the function name of the function definition of the target function has been changed to the second function name, and generating the protected executable code by inserting a decryption code into the reserved area of an executable code output by the linker and encrypting the target function within the executable code.

2. The portable recorded storage medium according to claim 1, wherein:
   the inserted function includes a decryption code for decrypting the target function that has been encrypted as the process relating to protection; and
   the process generating the protected executable code includes a process to encrypt the target function.

3. The portable recorded storage medium according to claim 2, wherein the process generating the protected executable code includes:
   having a linker link the object code, in which the function name of the function definition of the target function has been changed to the second function name, and the inserted function; and
   generating the protected executable code by encrypting the target function in an executable code output by the linker.

4. The portable recorded storage medium according to claim 3, wherein the inserted function includes:
   fixed data area; and
   first relocation information for having the linker execute a process to write an address of the target function to the fixed data area.

5. The portable recorded storage medium according to claim 3, wherein:
   the inserted function includes second relocation information for having the linker execute a process to write an address of the target function to an operand for the call instruction.

6. The portable recorded storage medium according to claim 2, wherein:
   the inserted function includes mark information for finding the inserted function in the process for encrypting the target function.

7. The portable recorded storage medium according to claim 2, wherein:
the inserted function includes data indicating the size of the corresponding target function.

8. The portable recorded storage medium according to claim 2, wherein:
the decryption code includes a plurality of sub-decryption codes each of which decrypts the corresponding encryption; and
in the process for encrypting the target function, the target function is encrypted by an encryption process corresponding to at least one of the sub-decryption codes and the sub-decryption code used for encrypting the target function is encrypted with an encryption process corresponding to another sub-decryption code.

9. The portable recorded storage medium according to claim 2, wherein:
a plurality of different decryption codes are provided and different decryption codes are inserted for different target functions.

10. The portable recorded storage medium according to claim 9, wherein:
the plurality of different decryption codes respectively correspond to different encryption algorithms; and
in the process for generating the protected executable code, an encryption algorithm corresponding to the inserted decryption code is used to encrypt the target function corresponding to the decryption code.

11. The portable recorded storage medium according to claim 2, wherein:
the inserted function further includes, after the call instruction, a code to re-encrypt the target function.

12. The portable recorded storage medium according to claim 1, wherein the inserted function includes:
fixed data area; and
second relocation information for having the linker execute a process to write an address of the target function to the fixed data area.

13. The portable recorded storage medium according to claim 1, wherein the inserted function includes:
a code for saving a value of a register to be destroyed to a predetermined save area before the destruction is executed; and
a code for writing back to the register the value that has been saved to the save area before the target function is called after the process relating to protection.

14. The portable recorded storage medium according to claim 1, wherein:
the inserted function includes a code for copying and pushing onto a stack an argument from data pushed onto the stack by execution of an instruction calling the inserted function, before the target function is called after the process relating to protection.

15. The portable recorded storage medium according to claim 1, wherein the inserted function includes:
a code for saving to a predetermined save area a return address to a call origin of the inserted function before the target function is called after the process relating to protection; and
a code for returning execution to the return address that was saved in the save area after the execution of the target function ends and returns to the inserted function.

16. The portable recorded storage medium according to claim 1, the function for protecting a target function further comprising:
accepting an input from a user to specify a target function; and
changing the function name of a function definition of the specified target function in the object code to a second function name according to a predetermined rule.

17. The portable recorded storage medium according to claim 1, wherein:
the inserted function includes a code for detecting that the protected executable code is being analyzed by a tool and preventing the analysis of the target function if analysis is detected.

18. A method for creating a protected executable code comprising:
generating, using a processor, an inserted function, having a function name identical to the function name of a target function, that includes code for a process relating to protection of the target function and a call instruction for calling the target function after the process, the inserted function including a reserved area and relocation information for having a linker execute a process to write an address of the target function to an operand for the call instruction; and
generating, using a processor, a protected executable code on the basis of an object code, in which the function name of a function definition of the target function has been changed to a second function name, and the inserted function;
the process generating the protected executable code including having the linker link the inserted function and the object code, in which the function name of the function definition of the target function has been changed to the second function name, and generating the protected executable code by inserting a decryption code into the reserved area of an executable code output by the linker and encrypting the target function within the executable code.

19. A protected executable code creation apparatus comprising:
a processor for generating an inserted function, having a function name identical to the function name of a target function to be protected, that includes code for a process relating to protection of the target function and a call instruction for calling the target function after this process, the inserted function including a reserved area and relocation information for having a linker execute a process to write an address of the target function to an operand for the call instruction; and
said processor generating a protected executable code on the basis of an object code, in which the function name of a function definition of the target function has been changed to a second function name, and the inserted function;
said processor generating the protected executable code by having the linker link the inserted function and the object code, in which the function name of the function definition of the target function has been changed to the second function name, and generating the protected executable code by inserting a decryption code into the reserved area of an executable code output by the linker and encrypting the target function within the executable code.

* * * * *